United States Patent [19]

Gloskey

[11] Patent Number: 4,532,262

[45] Date of Patent: Jul. 30, 1985

[54] PROCESS FOR THE PREPARATION OF URETHANE FOAM

[76] Inventor: Carl R. Gloskey, 42 Mooring Buoy, Hilton Head Island, S.C. 29928

[21] Appl. No.: 591,953

[22] Filed: Mar. 21, 1984

[51] Int. Cl.³ .................... C08G 18/14; C08G 18/24; C01G 1/00
[52] U.S. Cl. .................................... 521/127; 423/494
[58] Field of Search ......................... 521/127

[56] References Cited

U.S. PATENT DOCUMENTS

| | | | |
|---|---|---|---|
| 3,391,091 | 7/1968 | Considine et al. | 521/127 |
| 3,476,933 | 11/1969 | Mendelsohn | 521/127 |
| 3,887,505 | 6/1975 | Demou et al. | 521/127 |
| 4,419,461 | 12/1983 | Arbir et al. | 521/127 |
| 4,456,696 | 6/1984 | Arbir et al. | 521/127 |

*Primary Examiner*—Herbert S. Cockeram

[57] ABSTRACT

This invention comprises a process of making a polyurethane foam from polyisocyanates and polyols in the presence of bivalent tin carboxylate catalyst. The procedure consists of a novel method of preparation and hydrolysis of the tin catalyst. Stannous chloride prepared in the presence of at least 10% and up to 50% excess tin is used to prepare a desirable low viscosity stannous carboxylate.

8 Claims, No Drawings

PROCESS FOR THE PREPARATION OF URETHANE FOAM

This invention relates to the preparation of polyurethane and more specifically to an improved process for making polyurethane foam plastics.

Catalysis of processes for the preparation of urethane has been accomplished heretofore with a wide range of materials based on antimony, lead, tin and various bases or alkalis. These materials have various undesirable characteristics. Antimony compounds used as catalysts result in excessive liberation of $CO_2$; lead compounds are toxic and can cause health problems; the alkalis and organic bases are uncontrollable. Tin compounds such as the organic acid salts of 2-ethylhexoic acid, or oleic acid have to data been the catalyst of choise; however, they have not been prepared identically routinely to yield top quality urethane foam.

The problems of urethane foam manufacture involve the variable chemical and physical properties of the tin carboxylates. Tin carboxylates can be prepared as stannic carboxylates or stannous carboxylates. Stannic compounds which are tetravalent, such as tin tetra(2-ethylhexoate), are ineffective as catalysts. Stannous compounds which are divalent, such as stannous di(2-ethylhexoate), are very effective catalysts. The stannous carboxylates, however, are very viscous and when exposed to air oxidize to the stannic form of tin which is as noted ineffective as a catalyst.

The present optimum tin catalyst is stannous bis (2-ethylhexoate). This compound, however, being quite viscous, is difficult to mix in the small quantities required as a catalyst. Urethane foam prepared from the viscous stannous bis(2-ethylhexoate) is frequently unsatisfactory due to poor mixing with the polyol and isocyanates which results in a foamed product lacking structural integrity; i.e., it may have poor tensile strength and tear easily and will not return to its original configuration after compression. Presently, many manufacturers dilute the tin catalyst with dioctyl phthalate or mineral oil; however, this does have the effect of reducing the catalytic action.

Gloskey in U.S. Pat. No. 3,681,272 has claimed 2-ethylhexoic acid mixtures with tin compounds such as:
(a) Bis(ethylhexanoyloxytin) oxide
(b) 2-ethylhexanoyloxytin hydroxide
(c) Bis(hydroxystannous) oxide
(d) Stannous hydroxide In this patent at least two components must be used; i.e., a, b, c or d and 2-ethylhexoic acid. In addition to the dual requirement of the 2-ethylhexoic acid, this process is disadvantageous in that three of the compounds, b, c and d, are insoluble and cannot be used in commercial facilities. Furthermore, Gloskey obviously used a mixture of all four tin compounds and acids due to the complexity of separating the individual compounds.

Stannous bis(2-ethylhexoate) has been prepared in the past from stannous oxide:

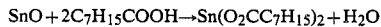

This process requires high temperature (225° C.) and yields a viscous colored product in yields below 90%. The tin carboxylates can also be prepared from sodium 2-ethylhexoate and stannous chloride yielding a viscous product.

It has been found that a stannous divalent carboxylate can be made by a new process to yield a polymeric stannous 2-ethylhexoate which does not require free 2-ethylhexoic acid, will have low viscosity (below 350 C.S. @ 25° C.), and has excellent shelf life stability.

The new process involves the preparation of stannous chloride hydrate in aqueous solution and heating in the presence of excess tin to avoid the formation of hydroxytin chloride. The stannous chloride can be prepared via several routes:

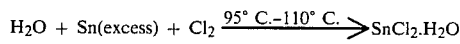

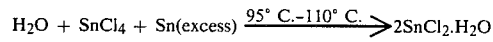

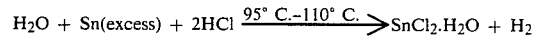

In order to prepare a tin catalyst of reproducible quality, it is essential that high purity stannous chloride is used. In British Pat. No. 1,380,638 Vulcan Materials Company describes the preparation of stannous chloride hydrate by reacting one mol of $SnCl_4$ with one mol of tin. This process yields a compound which may contain some hydroxyl groups and a HCl adduct; also, the stannic value may be higher than desirable by following the Vulcan process.

It has now been discovered that two conditions are required for the preparation of stannous chloride of the high quality necessary for preparation of stannous carboxylates of urethane catalysis activity. The stannous chloride must be prepared with an excess of tin, preferably 25%, and the reaction temperature must reach 95° C.-100° C. to complete the redistribution

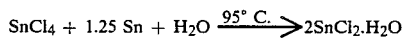

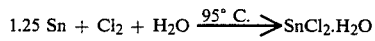

The excess tin is removed by conventional methods such as filtration.

Stannous carboxylates, typically stannous bis (2-ethylhexoate), is prepared by reacting the stannous chloride with an acid salt such a sodium 2-ethylhexoate or ammonium 2-ethylhexoate in aqueous solution. It has now been discovered that the problem of reproducible quality can be overcome if the viscous stannous bis (2-ethylhexoate) is washed with water to depolymerize the compound.

The embodiments of the process and compositions are disclosed in the following examples:

EXAMPLE #1

Stannous chloride was prepared using the Vulcan example #1 British Pat. No. 1,380,638. This product was then reacted with 2 mols of sodium 2-ethylhexoate aqueous solution. The resultant product emulsified and yielded a white precipitate probably tin hydroxy 2-ethylhexoate indicating the $SnCl_4.H_2O$ was not fully redistributed due to insufficient tin. This product did not work satisfactorily as a catalyst.

EXAMPLE #2

Stannous chloride was prepared using the Vulcan example #1 with 25% excess tin. This product was then reacted with 2 mols of sodium 2-ethylhexoate aqueous solution. The resultant product separated rapidly from the aqueous phase yielding a viscous stannous bis(2-ethylhexoate) which was difficult to meter and unsatisfactory as a catalyst. The stannous bis(2-ethylhexoate) made from example #2 has a viscosity of 650 C.S. at 250° C. When the samples are depolymerized by hydrolysis and extraction the viscosity may range from 150–250 centistokes @ 25° C. routinely which is the preferable range for catalysis use. These samples were good urethane foam catalysts.

EXAMPLE #3

Preparation of Stannous Chloride $$1.25Sn + SnCl_4 + 5H_2O \rightarrow 2SnCl_2.2H_2O + 0.25Sn + H_2O$$

148.5 g of tin chips (25% excess) is placed in a 500 ml flask containing 90 g of water. The flask, partially immersed in water cooling bath, is fitted with a reflux condenser, a thermometer 0°–150° C. range and a nitrogen addition tube. An amount of $SnCl_4$ equivalent to 260.5 gm is slowly added through the condenser while agitation is effected by the admission of nitrogen below the liquid level. An exothermic reaction occurs and the temperature is kept below 75° C. by external cooling of the flask. After the $SnCl_4$ addition has been completed, the cooling water bath is removed and a heating mantle is placed under the flask. The reaction is allowed to continue for 30 minutes and the flask content is then heated to 95°–100° C. for 30 minutes.

A sample of the product is removed via a fritted glass filter to separate the excess tin and assayed. Analysis of the product which is stannous chloride hydrate indicates no stannic chloride remaining and a stannous chloride hydrate assay of 98.5%.

EXAMPLE #4

Preparation of Stannous Bis(2-ethylhexoate)

$$2NaOH + 2C_7H_{15}COOH \rightarrow 2NaO_2CC_7H_{15} + 2H_2O$$

$$2NaO_2CC_7H_{15} + SnCl_2 \rightarrow Sn(O_2CC_7H_{15})_2 + 2NaCl$$

A 1000 ml apparatus similar to that in example #1 is arranged with a heating mantle and a mechanical agitator. 650 ml of water is placed in the flask and admixed with 288.4 g of 2-ethylhexoic acid. 80 g of sodium hydroxide is added to the water-acid mix and reacted at 75° C. for 30 minutes yielding a solution of sodium 2-ethylhexoate. 230.0 g of stannous chloride hydrate (equivalent to 225.6 $SnCl_2.H_2O$) is added and the reaction is carried on for 30 minutes at 75°–85° C. The agitation it stopped and the liquid and oil phase (bottom) are separated. The oil phase is washed with 200 ml of cold water and then dried under vacuum at 90° C. The yield of product depolymerized stannous bis(2-ethylhexoate) is 97.5% with an analysis of 29.0% stannous tin (29.3 is theory) and a viscosity of 250 C.S.

EXAMPLE #5

Preparation of Urethane Foam

Urethane foam may be prepared by mixing:

| | |
|---|---|
| Niax Triol LG-56 (Polyalkylene Polyol, Union Carbide Co.) | 100 gm |
| L-520 dimethyl polysiloxane (Union Carbide Co.) | 1.5 gm |
| Tolylene diisocyanate | 45.0 gm |
| Water | 3.5 gm |
| Catalyst | 0.3 gm |
| Blowing catalyst (n-ethyl morpholine) (triethyl diamine) | 0.6 gm |

Foam is prepared by mixing the components with good stirring. The mixture immediately reacts giving off heat and liberating $CO_2$ which causes the paste-like product to rise. The time for completion of the rise of the foam ideally is 95–100 seconds.

In experiments using stannous bis(2-ethylhexoate) the rise time was 110 seconds and the foam at the center of the mass was easily torn whereas the exterior had smaller cell structure and appeared strong.

Using the depolymerized stannous bis(2-ethylhexoate) product of this patent claim, the rise time was 97 seconds and the foam was strong inside and out and had cell structure of uniform size throughout.

What is claimed is:

1. A process for the preparation of plastic polyurethane foam by the reaction of polyisocyanates and polyols in the presence of a catalyst and a foaming agent, utilizing as the catalyst a stannous carboxylate prepared from stannous chloride prepared with an excess of at least 10% tin at 95°–100° C. and thereafter reacting said stannous chloride with an alkali carboxylate and thereafter depolymerizing the resulting stannous carboxylate.

2. The process of claim 1 wherein the excess of tin is between 10–50%.

3. The process of claim 1 where the alkali carboxylate is alkali 2-ethylhexoate.

4. The process of claim 1 where the alkali carboxylate is alkali oleate.

5. The process of claim 1 where the alkali carboxylate is sodium, potassium, or ammonium carboxylate.

6. The process of claim 1 where the stannous carboxylate is prepared from an organic acid containing 2–18 carbon atoms.

7. The process of claim 1 where the amount of catalyst is below 5% by weight of the total weight of the active ingredients in the polyurethane foam formulation.

8. A process for the preparation of polyurethane foam as in claim 1, wherein less than 5% by weight of the total active ingredients of a tin catalyst is used, and wherein said tin catalyst is a stannous bis(2-ethylhexoate) prepared from
    (a) stannous chloride by reacting tin with stannic chloride hydrate or chlorine or hydrochloric acid wherein
    (b) the tin is between 10–50% excess and
    (c) the reaction is conducted at 95°–100° C. for one hour or until the stannous tin value of the solution exceeds 98% of the total soluble tin.

* * * * *